(12) United States Patent
Oh

(10) Patent No.: US 7,696,425 B2
(45) Date of Patent: Apr. 13, 2010

(54) KEY PAD ASSEMBLY AND ELECTRONIC DEVICE HAVING THE SAME

(75) Inventor: Seoung-Myun Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 568 days.

(21) Appl. No.: 11/428,049

(22) Filed: Jun. 30, 2006

(65) Prior Publication Data

US 2007/0221041 A1 Sep. 27, 2007

(30) Foreign Application Priority Data

Mar. 13, 2006 (KR) .................... 10-2006-0023162

(51) Int. Cl.
*G10C 3/12* (2006.01)
*H01H 9/00* (2006.01)
*H01H 9/26* (2006.01)
*H04B 1/38* (2006.01)
*H04M 1/00* (2006.01)

(52) U.S. Cl. .................. 84/433; 200/5 A; 200/310; 455/90.1

(58) Field of Classification Search ................. 84/433; 200/310, 5 A; 544/90.1
See application file for complete search history.

(56) References Cited

U.S. PATENT DOCUMENTS

| 4,251,697 | A | * | 2/1981 | Rico Gonzalez | 200/5 A |
| 5,875,560 | A | * | 3/1999 | Boe et al. | 33/366.11 |
| 6,463,263 | B1 | * | 10/2002 | Feilner et al. | 455/90.1 |
| 2002/0049070 | A1 | * | 4/2002 | Bick | 455/550 |
| 2005/0150753 | A1 | * | 7/2005 | Hsu | 200/314 |
| 2006/0260921 | A1 | * | 11/2006 | Lee et al. | 200/313 |
| 2006/0261984 | A1 | * | 11/2006 | Jung et al. | 341/31 |
| 2006/0289283 | A1 | * | 12/2006 | Jung et al. | 200/310 |
| 2007/0012553 | A1 | * | 1/2007 | Lee et al. | 200/310 |
| 2007/0184877 | A1 | * | 8/2007 | In et al. | 455/565 |
| 2007/0296702 | A1 | * | 12/2007 | Strawn et al. | 345/169 |
| 2008/0283375 | A1 | * | 11/2008 | Iohara | 200/296 |

* cited by examiner

*Primary Examiner*—Jeffrey Donels
*Assistant Examiner*—Christina Russell
(74) *Attorney, Agent, or Firm*—Birch, Stewart, Kolasch & Birch, LLP

(57) ABSTRACT

A keypad assembly, which includes at least one key configured to be provided at an outer surface of a body of an electronic device, a substrate including at least one switch that closes when the at least one key is depressed, and a supporting plate configured to detachably attach to an inner surface of the body of the electronic device, the supporting plate fixing the at least one key and the substrate to the body of the electronic device.

8 Claims, 4 Drawing Sheets

KEY PAD ASSEMBLY AND ELECTRONIC DEVICE HAVING THE SAME

This application claims the benefit of Korean Application No. 10-2006-0023162, filed on Mar. 13, 2006, which is hereby incorporated by reference in its entirety.

BACKGROUND OF THE INVENTION

1. Field of the Invention

The present invention relates to a key pad assembly and an electronic device having the same, and more particularly, to a key pad assembly which can be easily attached to and detached from a body of an electronic device.

2. Description of the Background Art

Generally speaking, a mobile communication terminal is a portable communication device which performs wireless communication.

Recently, some conventional mobile communication terminals have been provided with variety of multimedia functions, such as a game function, a movie watching function, a music listening function, etc.

Some mobile communication terminals are provided with a music-on-demand (MOD) key, which when pressed, causes a mobile communication terminal to perform an MP3 function. The MOD key is formed in a keypad assembly which is mounted in the body of the mobile communication terminal.

A conventional keypad assembly is typically constructed according to one of the two following implementations.

In a first implementation, a key support structure is formed on a first body, and at least one key is mounted on a second body which engages with the first body, such that the key support structure supports the key. The existence of the key support structure requires that extra space be provided within the mobile communication terminal. Accordingly, when a key is pressed, there is an increased key motion and an increased noise.

In a second implementation, the keypad assembly is thermally adhered to a body of the mobile communication terminal. Although this implementation does not require as much space within the mobile communication terminal as the first implementation, and thus there is less key motion and noise, it is difficult to replace or repair keys if they become defective.

BRIEF DESCRIPTION OF THE INVENTION

Therefore, an object of the present invention is to provide a keypad assembly which minimizes the motion and noise caused by pressing a key, yet which may be easily repaired.

To achieve these and other advantages and in accordance with the purpose of the present invention, as embodied and broadly described herein, there is provided a keypad assembly, which includes at least one key configured to be provided at an outer surface of a body of an electronic device, a substrate including at least one switch that closes when the at least one key is depressed, and a supporting plate configured to detachably attach to an inner surface of the body of the electronic device, the supporting plate fixing the at least one key and the substrate to the body of the electronic device.

The keypad assembly may also include a pressing pad disposed between the at least one key and the substrate and including a pressing protrusion, the pressing protrusion pressing the at least one switch when the at least one key is depressed.

The keypad assembly may also include a connector which attaches the supporting plate to the inner surface of the body of the electronic device. The connector may include at least one hook portion formed on the supporting plate which connects to at least one coupling groove formed on the inner surface of the body of the electronic device. The connector may also include at least one coupling groove formed on the supporting plate, to which at least one hook portion formed on the inner surface of the body of the electronic device connects.

The keypad assembly may also include at least one insulating groove formed in the supporting plate which engages with at least one insulating protrusion provided on the inner surface of the body of the electronic device, the insulating protrusion including an elastic material which absorbs vibration. The electronic device may be a mobile communication device.

There is also provided an electronic device, which includes a housing including a first body and a second body which is attached to the first body, and a keypad assembly attached to the first body, the keypad assembly including at least one key provided at an outer surface of the first body, a substrate including at least one switch that closes when the at least one key is depressed, and a supporting plate detachably attached to an inner surface of the first body, the supporting plate fixing the at least one key and the substrate to the first body.

The electronic device may also include a pressing pad disposed between the at least one key and the substrate and including a pressing protrusion, the pressing protrusion pressing the at least one switch when the at least one key is depressed.

The electronic device may also include a connector which attaches the supporting plate to the inner surface of the first body. The connector may include at least one hook portion formed on one of the first body and the supporting plate, and at least one coupling groove formed on the other of the first body and the supporting plate, the at least one hook portion connecting to the at least one coupling groove.

The electronic device may also include at least one insulating portion formed between the supporting plate and the first body that reduces transfer of vibration between the supporting plate and the first body. The insulating portion may include an insulating protrusion provided on one of the supporting plate and the first body and formed of an elastic material, and an insulating groove formed on the other of the supporting plate and the first body, the insulating protrusion engaging with the insulating groove.

The electronic device may also include a supporting portion formed on the second body and provided underneath the supporting plate which holds the keypad assembly to the first body. The supporting portion may include a guide rib which holds a component of the electronic device, other than the keypad assembly, in place. The electronic device may be a mobile communication device.

There is also provided a method of assembling an electronic device, which includes positioning at least one key at an inner surface of a first body of the electronic device, positioning a substrate including at least one switch underneath the at least one key, positioning a supporting plate underneath the substrate, and attaching the supporting plate to the inner surface of the first body to fix the at least one key and the substrate to the first body.

Attaching the supporting plate may include engaging at least one hook portion formed on one of the supporting plate and the first body with at least one coupling groove formed on the other of the supporting plate and the first body. Attaching the supporting plate may also include pressing the supporting plate to the first body with a snap-fit type of action.

The supporting plate may be detachable from the first body. The supporting plate may be configured to detach from the first body by being elastically deformed.

The method may also include connecting the first body to a second body of the electronic device. A supporting portion formed on the second body may be provided underneath the supporting plate when the first body is connected to the second body. The electronic device may be a mobile communication terminal.

The foregoing and other objects, features, aspects and advantages of the present invention will become more apparent from the following detailed description of the present invention when taken in conjunction with the accompanying drawings.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF THE INVENTION

Description will now be given in detail of the present invention, examples of which are illustrated in the accompanying drawings.

Figure 1:
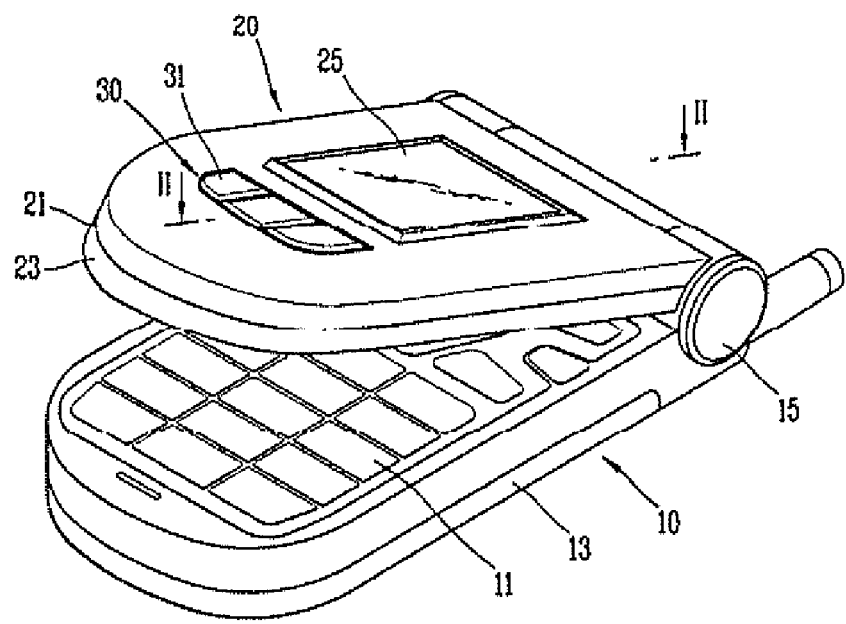
FIG. 1 is a perspective view showing an electronic device having a keypad assembly according to one embodiment of the present invention.

FIG. 1 is a perspective view showing an electronic device having a keypad assembly according to one embodiment of the present invention.

The electronic device shown in FIG. 1 is a mobile communication terminal. However, this is but one example of an electronic device with which the keypad assembly of the present invention may be utilized. Other examples of electronic devices with which the keypad assembly may be utilized include, but are not limited to, portable game devices, portable music players, wireline and cordless telephones, PDAs, calculators, etc. Generally, it is envisioned that the keypad assembly of the present invention may be utilized with any electronic device which has a key or button.

The electronic device shown in FIG. 1 includes first and second housings 10 and 20, and a keypad assembly 30 which detachably connects to one of the first or second housings 10 or 20. In the embodiment illustrated, the keypad assembly 30 connects to the second housing 20, and the first housing 10 rotatably connects to the second housing 20.

The exemplary electronic device shown in FIG. 1 includes input keys 11 for inputting characters, numbers, etc., which are disposed on a front surface of the first housing 10. The electronic device also includes a battery 13 for supplying power to the housings 10 and 20, which is detachably disposed at a rear surface of the first housing 10. A printed circuit board (PCB) for controlling a function of each component mounted in the electronic device is disposed in the first housing 10. A hinge portion 15 is provided at an upper edge of the first housing 10, which rotatably couples the second housing 20 to the first housing 10, such that the electronic device has a closed state and an open state.

In the electronic device shown in FIG. 1, the second housing 20 includes a first body 21 and a second body 23, which are coupled together. A display 25 is disposed in the middle of an outer surface of the first body 21, and a key 31 of a keypad assembly 30 protrudes through an outer surface of the first body 21.

An exemplary keypad assembly 30 is explained below in more detail with reference to FIG. 2.

Figure 2:
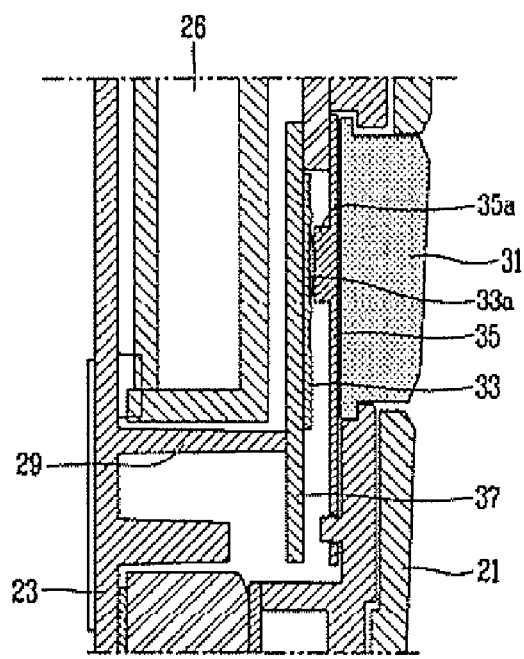
FIG. 2 is a sectional view taken along line II-II of FIG. 1.

FIG. 2 is a sectional view taken along line II-II of FIG. 1.

As shown, the keypad assembly 30 includes at least one key 31, a substrate 33, and a supporting plate 37.

The key 31 may correspond to any operation of an electronic device. For example, the key 31 may be a music on demand (MOD) key for a mobile communication terminal, which controls an MP3 function when pressed. In the example shown in FIG. 1, since the key 31 is provided on the outer surface 21 of the second housing 20, the key 31 may be operated even when the mobile communication terminal is a closed state (e.g., a non-call state).

When the key 31 is depressed, a pressing pad 35 disposed underneath the key 31 is moved downward towards the substrate 33. The pressing pad 35 may be formed of an elastic material such as rubber, and includes a pressing protrusion 35a on its bottom side.

Figure 4:
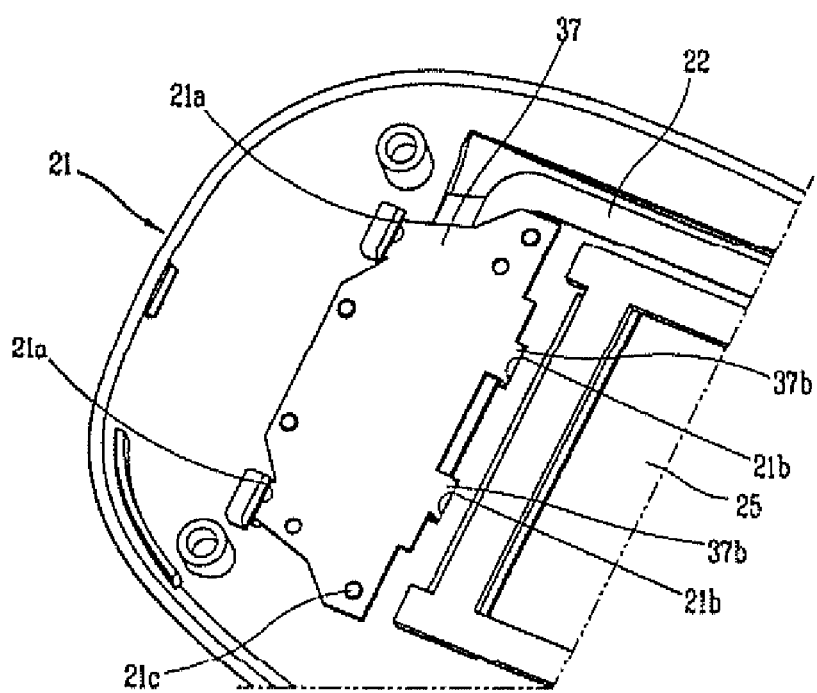
FIG. 4 is a perspective view showing a state in which the supporting plate of FIG. 3 is coupled to a body of an electronic device according to one embodiment of the present invention.
Figure 5:
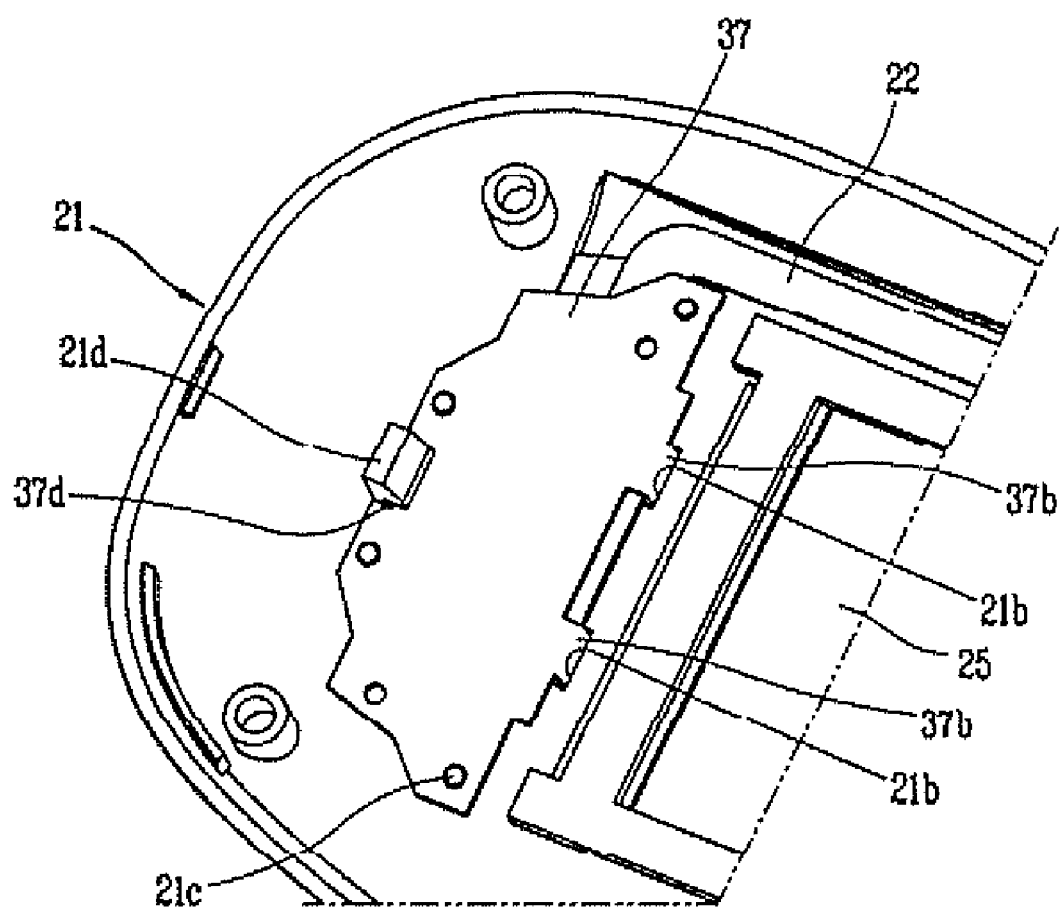
FIG. 5 is a perspective view showing a state in which the supporting plate of FIG. 3 is coupled to a body of an electronic device according to another embodiment of the present invention.

A switch 33a is formed on an upper surface of the substrate 33. When a user presses the key 31, the pressing protrusion 35a of the pressing pad 35 presses downward on the switch 33a, thereby closing the switch 33a, which is electrically connected to the substrate 33. The substrate 33 is electrically connected to other components of the electronic device. For example, the substrate 33 may be electrically connected to a PCB disposed in the first housing 10 of the electronic device illustrated in FIG. 1. Such connection may be provided, for example, by a cable 22, as shown in FIGS. 4 and 5.

A bottom portion of the substrate 33 is supported by the supporting plate 37, which detachably connects to the first body 21. The supporting plate 37 fixes the key 31, the pressing pad 35, and the substrate 33 to the first body 21.

The electronic device may also include a supporting portion provided on the second body 23 underneath the supporting plate 37 which holds the keypad assembly 30 to the first body 21.

The supporting portion may be implemented as a guide rib 29, which has the additional function of holding a display module 26 of the display 25, or another component of the electronic device, in place. This way, an additional structure does not need to be provided in the electronic device. Further, if the height of the guide rib 29 is greater than that of the display module 26 or other component, the keypad assembly 30 can be arranged in the electronic device such that there is a vertical overlap between the keypad assembly 30 and the display module 26 or other component, as shown in FIG. 2.

Accordingly, the supporting portion described above serves to prevent the supporting plate 37 of the keypad assembly 30 from detaching from the first body 21 when a key 31 is excessively depressed.

Figure 3:
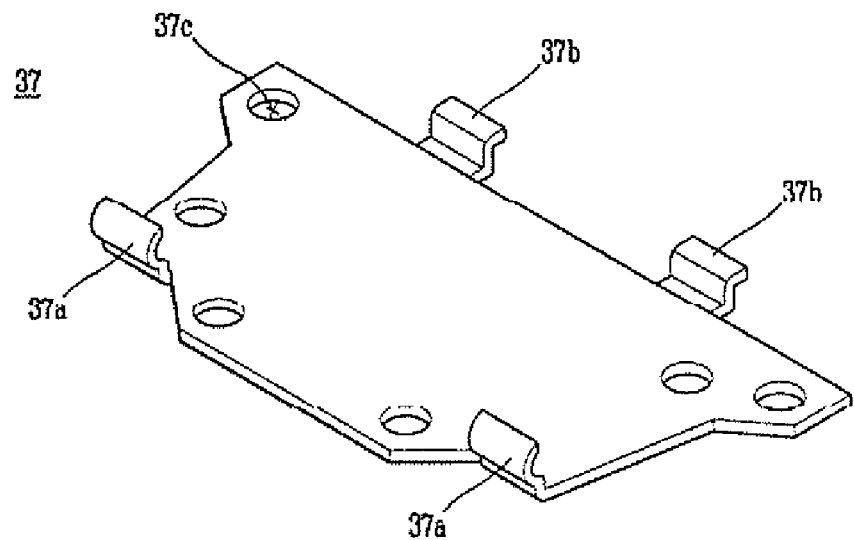
FIG. 3 is a perspective view showing a supporting plate of FIG. 2.

FIGS. 3 to 5 illustrate embodiments of a connection between the keypad assembly 30 and the electronic device.

FIG. 3 is a perspective view showing the supporting plate of FIG. 2, FIG. 4 is a perspective view showing a state in which the supporting plate of FIG. 3 is coupled to a body of an electronic device according to one embodiment, and FIG. 5 is a perspective view showing a state in which the supporting plate of FIG. 3 is coupled to a body of an electronic device according to another embodiment.

In the embodiment illustrated in FIGS. 3 and 4, hook portions 37a and 37b are formed on the supporting plate 37. The hook portions 37a and 37b are configured to connect to coupling grooves 21a and 21b formed on an inner surface of the first body 21. The hook portions 37a and 37b and coupling grooves 21a and 21b allow the supporting plate 37 to connect to the first body 21 with a snap-fit type of connection by pressing the supporting plate 37 towards the first body 21.

In the aforementioned embodiment, the hook portions 37a and 37b are formed on the supporting plate 37, and the coupling grooves 21a and 21b are formed on the inner surface of the first body 21. However, a contrary case is also possible, which will be explained with reference to FIG. 5.

In the embodiment shown in FIG. 5, a coupling groove 37d is formed at an edge of the supporting plate 37, opposite the edge of the supporting plate 37 at which the hook portions 37b are formed. A corresponding hook portion 21d is formed on an inner surface of the first body 21. In this embodiment, to connect the supporting plate 37 to the first body 21, the hook portions 37b of the supporting plate 37 are inserted into the coupling grooves 21b of the first body 21, and the supporting plate 37 is then pressed against the first body 21 so that the hook portion 21d engages with the coupling groove 37d, in a snap-fit type of action.

According to another embodiment, insulating portions may be provided between the body of the electronic device and the keypad assembly 30 to reduce the transfer of vibration between the body of the electronic device and the keypad assembly 30.

For example, the first body 21 may be provided with a plurality of insulating protrusions 21c which engage with insulating grooves 37c formed in the supporting plate 37. The insulating protrusions 21c may be formed of an elastic member such as, rubber or silicon, which absorbs vibrations well. Alternatively, the insulating protrusions may be formed on the supporting plate 37, and the insulating grooves may be formed on the first body 21.

A method for attaching and detaching the key pad assembly 30 to and from the first body 21 will be explained with reference to FIG. 6.

Figure 6:
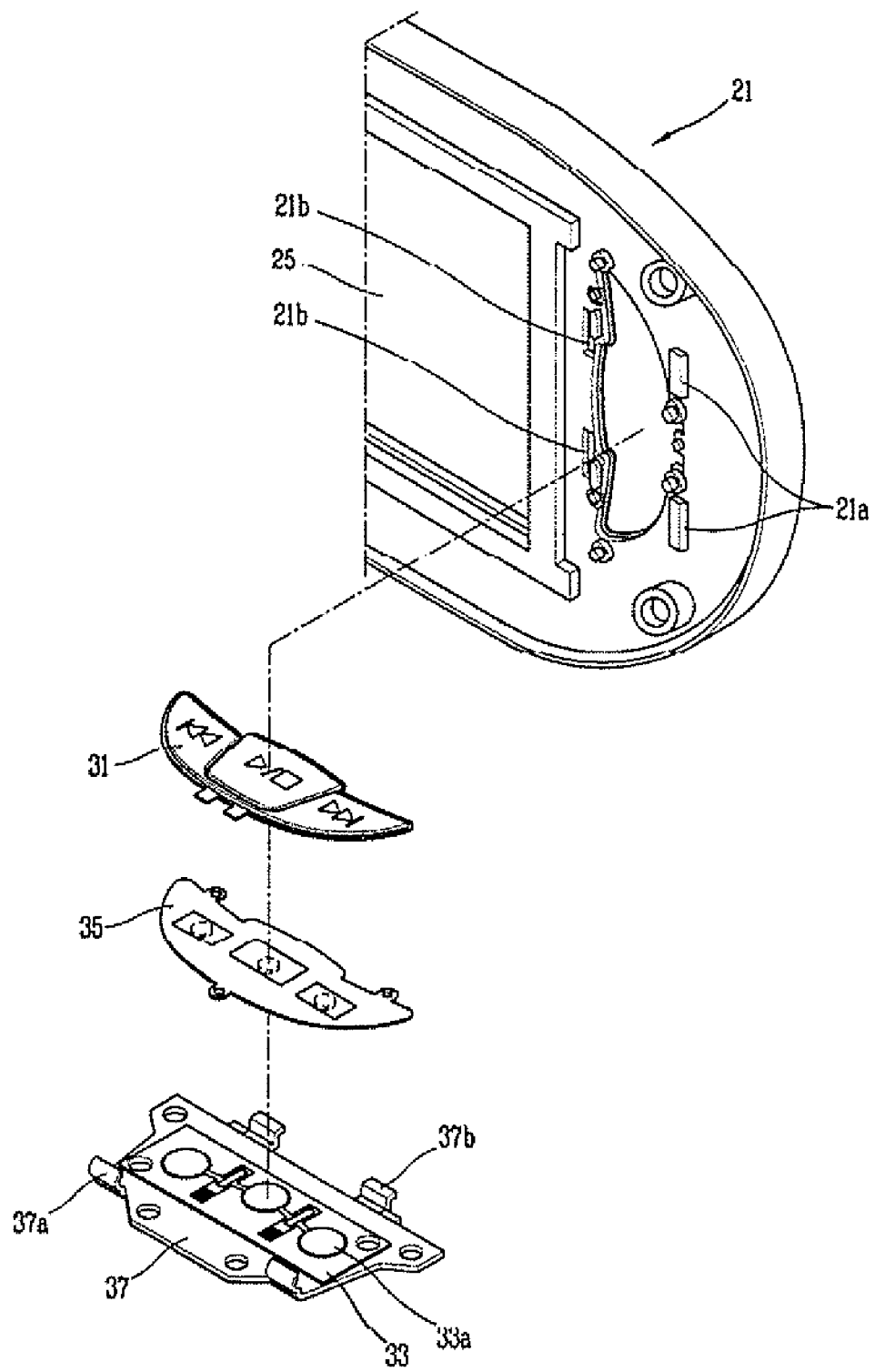
FIG. 6 is a perspective view showing a process of attaching and detaching a keypad assembly to and from a body of an electronic device.

FIG. 6 is a perspective view showing a process of attaching and detaching a keypad assembly to and from a body of an electronic device.

First, a key 31 is positioned at an inner surface of the first body 21 such that it protrudes through a corresponding hole of the first body 21. The pressing pad 35 and substrate 33 are then positioned underneath the key 31.

The supporting plate 37 is then positioned underneath the substrate 33, such that the hook portions 37a and 37b engage with the coupling grooves 21a and 21b of the first body 21. The supporting plate 37 is then pressed into place with a snap-fit type of action.

This type of connection allows the keypad assembly to be easily detached from the body of the electronic device. The supporting plate 37 is flexible enough for a user to disengage the hook portions 37a and 37b from the coupling grooves 21a and 21b by elastically deforming the supporting plate 37 by squeezing the supporting plate 37 inward and pulling the supporting plate 37 away from the first body 21.

When the supporting plate 37 is attached to the first body 21, the insulating protrusions 21c of the first body 21 are inserted into the insulating grooves 37c of the supporting plate 37 to reduce the transfer of vibration between the body of the electronic device and the keypad assembly 30.

Once the supporting plate 37 is attached to the inside of the first body 21, the first body 21 can then be connected to the second body 23 to complete the assembly of the second housing 20, as shown in FIG. 1.

As shown in FIG. 2, when the first body 21 and second body 23 are attached, the guide rib 29 formed on the second body 23 supports the supporting plate 37 to prevent it from detaching from the first body 21 when a key 31 of the keypad assembly 30 is pressed excessively, The keypad assembly disclosed above can be easily attached to and detached from the body of an electronic device using a snap-fit type of action. Accordingly, the keys of the keypad assembly may be easily repaired or replaced.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural substitutions and changes may be made without departing from the scope of the disclosure. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

Although the invention has been described with reference to several exemplary embodiments, it is understood that the words that have been used are words of description and illustration, rather than words of limitation. As the present invention may be embodied in several forms without departing from the spirit or essential characteristics thereof, it should also be understood that the above-described embodiments are not limited by any of the details of the foregoing description, unless otherwise specified. Rather, the above-described embodiments should be construed broadly within the spirit and scope of the present invention as defined in the appended claims. Therefore, changes may be made within the metes and bounds of the appended claims, as presently stated and as amended, without departing from the scope and spirit of the invention in its aspects.

What is claimed is:

1. An electronic device, comprising:
    a housing comprising a first body and a second body which is attached to the first body, the housing having an inner space formed between the first body and the second body; and
    a keypad assembly attached to the first body, the keypad assembly comprising:
        at least one key provided at an outer surface of the first body;
        a substrate comprising at least one switch that closes when the at least one key is depressed;
        a supporting plate disposed at the inner space of the housing, the supporting plate being detachably attached to an inner surface of the first body, and the supporting plate fixing the at least one key and the substrate to the first body; and
        a connector which attaches the supporting plate to the inner surface of the first body.

2. The electronic device according to claim 1, further comprising a pressing pad disposed between the at least one key and the substrate and comprising a pressing protrusion, the pressing protrusion pressing the at least one switch when the at least one key is depressed.

3. The electronic device according to claim 1, wherein the connector comprises:
    at least one hook portion formed on one of the first body and the supporting plate; and
    at least one coupling groove formed on the other of the first body and the supporting plate, the at least one hook portion connecting to the at least one coupling groove.

4. The electronic device according to claim 1, further comprising at least one insulating portion formed between the supporting plate and the first body that reduces transfer of vibration between the supporting plate and the first body.

5. The electronic device according to claim 4, wherein the insulating portion comprises:
    an insulating protrusion provided on one of the supporting plate and the first body and formed of an elastic material; and
    an insulating groove formed on the other of the supporting plate and the first body, the insulating protrusion engaging with the insulating groove.

6. The electronic device according to claim 1, further comprising a supporting portion formed on the second body and extending to the supporting plate which holds the keypad assembly to the first body.

7. The electronic device according to claim 6, wherein the supporting portion comprises a guide rib which holds a component of the electronic device, other than the keypad assembly, in place.

8. The electronic device according to claim 1, wherein the electronic device comprises a mobile communication terminal.

* * * * *